US012096150B2

(12) United States Patent
Ilan et al.

(10) Patent No.: US 12,096,150 B2
(45) Date of Patent: *Sep. 17, 2024

(54) IMAGE STITCHING IN THE PRESENCE OF A FULL FIELD OF VIEW REFERENCE IMAGE

(71) Applicant: Corephotonics Ltd., Tel Aviv (IL)

(72) Inventors: Paz Ilan, Tel Aviv (IL); Shai Vaisman, Tel Aviv (IL); Ruthy Katz, Tel Aviv (IL); Adi Teitel, Tel Aviv (IL); Hagai Tzafrir, Tel Aviv (IL); Gal Shabtay, Tel Aviv (IL); Oded Gigushinski, Tel Aviv (IL); Itamar Azoulai, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,849

(22) Filed: Aug. 8, 2023

(65) Prior Publication Data
US 2023/0412755 A1 Dec. 21, 2023

Related U.S. Application Data

(63) Continuation of application No. 17/771,049, filed as application No. PCT/IB2021/054070 on May 12, 2021.
(Continued)

(51) Int. Cl.
H04N 5/262 (2006.01)
H04N 5/265 (2006.01)
(Continued)

(52) U.S. Cl.
CPC ........... H04N 5/2628 (2013.01); H04N 5/265 (2013.01); H04N 23/69 (2023.01); H04N 23/698 (2023.01); H04N 23/81 (2023.01)

(58) Field of Classification Search
None
See application file for complete search history.

(56) References Cited

U.S. PATENT DOCUMENTS 3,085,354 A 4/1963 Rasmussen et al.
3,584,513 A 6/1971 Gates
(Continued)

FOREIGN PATENT DOCUMENTS

CN 101276415 A 10/2008
CN 201514511 U 6/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

Primary Examiner — Eileen M Adams
(74) Attorney, Agent, or Firm — Nathan & Associates; Menachem Nathan

(57) ABSTRACT

Systems and methods for obtaining a seamless, high resolution, large field of view image comprise capturing a plurality of Tele images in a scene using a scanning Tele camera, each captured Tele image having an associated Tele field of view $FOV_T$, retrieving a R image having a respective R image scene with a field of view greater than $FOV_T$, analyzing the R image for defining an order of scanning positions according to which the folded Tele camera scans a scene to capture the plurality of Tele images, aligning the plurality of Tele images and the R image to obtain aligned Tele images, and composing the aligned Tele images into an output image. The output image may include at least parts of the R image and may be one of a stream of output images.

21 Claims, 14 Drawing Sheets

Related U.S. Application Data

(60) Provisional application No. 63/026,097, filed on May 17, 2020.

(51) Int. Cl.
*H04N 23/69* (2023.01)
*H04N 23/698* (2023.01)
*H04N 23/81* (2023.01)

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 11,832,018 B2 * | 11/2023 | Ilan .................. H04N 5/265 |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |

(56) References Cited

U.S. PATENT DOCUMENTS

| | | |
|---|---|---|
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |

(56) References Cited

U.S. PATENT DOCUMENTS

| | | |
|---|---|---|
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0124987 A1 | 5/2017 | Kim et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0184010 A1* | 6/2018 | Cohen .............. H04N 23/69 |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2018/0329281 A1 | 11/2018 | Ye |
| 2018/0368656 A1 | 12/2018 | Austin et al. |
| 2019/0100156 A1 | 4/2019 | Chung et al. |
| 2019/0121103 A1 | 4/2019 | Bachar et al. |
| 2019/0121216 A1* | 4/2019 | Shabtay .............. H04N 23/61 |
| 2019/0130822 A1 | 5/2019 | Jung et al. |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0228562 A1 | 7/2019 | Song |
| 2019/0297238 A1 | 9/2019 | Klosterman |
| 2020/0103726 A1 | 4/2020 | Shabtay et al. |
| 2020/0104034 A1 | 4/2020 | Lee et al. |
| 2020/0134848 A1 | 4/2020 | El-Khamy et al. |
| 2020/0221026 A1 | 7/2020 | Fridman et al. |
| 2020/0264403 A1 | 8/2020 | Bachar et al. |
| 2020/0389580 A1 | 12/2020 | Kodama et al. |
| 2021/0180989 A1 | 6/2021 | Fukumura et al. |
| 2021/0333521 A9 | 10/2021 | Yedid et al. |
| 2022/0252963 A1 | 8/2022 | Shabtay et al. |

FOREIGN PATENT DOCUMENTS

| | | |
|---|---|---|
| CN | 102215373 A | 10/2011 |
| CN | 102739949 A | 10/2012 |
| CN | 102982518 A | 3/2013 |
| CN | 103024272 A | 4/2013 |
| CN | 203406908 U | 1/2014 |
| CN | 103841404 A | 6/2014 |
| CN | 205301703 U | 6/2016 |
| CN | 105827903 A | 8/2016 |
| CN | 105847662 A | 8/2016 |
| CN | 107608052 A | 1/2018 |
| CN | 107682489 A | 2/2018 |
| CN | 109729266 A | 5/2019 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |
| JP | 2005099265 A | 4/2005 |
| JP | 2005122084 A | 5/2005 |
| JP | 2005321592 A | 11/2005 |
| JP | 2006237914 A | 9/2006 |
| JP | 2006238325 A | 9/2006 |
| JP | 2007228006 A | 9/2007 |
| JP | 2007306282 A | 11/2007 |
| JP | 2008076485 A | 4/2008 |
| JP | 2008271026 A | 11/2008 |
| JP | 2010204341 A | 9/2010 |
| JP | 2011055246 A | 3/2011 |
| JP | 2011085666 A | 4/2011 |
| JP | 2011138407 A | 7/2011 |
| JP | 2011203283 A | 10/2011 |
| JP | 2012132739 A | 7/2012 |
| JP | 2013101213 A | 5/2013 |
| JP | 2013106289 A | 5/2013 |
| JP | 2016105577 A | 6/2016 |
| JP | 2017146440 A | 8/2017 |
| KR | 20070005946 A | 1/2007 |
| KR | 20090058229 A | 6/2009 |
| KR | 20100008936 A | 1/2010 |
| KR | 20110080590 A | 7/2011 |
| KR | 20130104764 A | 9/2013 |
| KR | 1020130135805 A | 11/2013 |
| KR | 20140104787 A | 2/2014 |
| KR | 101428042 B1 | 8/2014 |
| KR | 101477178 B1 | 12/2014 |
| KR | 20140144126 A | 12/2014 |
| KR | 20150118012 A | 10/2015 |
| KR | 20170105236 A | 9/2017 |
| KR | 20180120894 A | 11/2018 |
| KR | 20130085116 A | 6/2019 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7 μm Pixels in 0.11 μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

(56) References Cited

OTHER PUBLICATIONS

Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.

\* cited by examiner (a) (b) (c) (d) (e)

IMAGE STITCHING IN THE PRESENCE OF A FULL FIELD OF VIEW REFERENCE IMAGE

CROSS REFERENCE TO RELATED APPLICATIONS

This application is a continuation application of U.S. patent application Ser. No. 17/771,049 filed Apr. 22, 2022, which is a 371 application from international patent application PCT/IB2021/054070 filed May 12, 2021, and is related to and claims priority from U.S. Provisional Patent Application No. 63/026,097 filed May 17, 2020, which is incorporated herein by reference in its entirety.

FIELD

The subject matter disclosed herein relates in general to image stitching and in particular to methods for stitching images taken with a small FOV camera in the presence of a large FOV image.

BACKGROUND

Multi-aperture cameras (or multi-cameras) are the standard for high-end mobile handheld devices ("mobile devices", e.g. smartphone, tablet, etc.). A multi-camera usually comprises a wide field of view ($FOV_W$) or "wide angle" camera ("Wide" camera or "W camera"), and one or more additional cameras, either with the same FOV, with a narrow FOV (Telephoto or "Tele" camera or "T" camera with Tele $FOV_T$) or an ultra-wide camera with a $FOV_{UW} > FOV_W$ ("UW camera").

The Tele-Wide or Tele-Ultra-Wide multi-camera (which in the following may be referred to as a "Tele-Reference" multi-camera) combines benefits of both cameras to overcome shortcomings. It captures a large reference camera $FOV_R$ of the scene with the reference camera ("R camera") that provides reference (R) images with a R camera resolution ("$RES_R$") and R signal-to-noise ratio ($SNR_R$) and uses the higher Tele camera resolution ("$RES_T$") and SNR ($SNR_T$) to zoom into the scene with $FOV_T$. However, as the Tele camera resolution increases, $FOV_T$ narrows, so that only a fraction of a scene can be captured.

A recent development is a scanning Tele camera that can scan a scene with its regular (native) $FOV_T$, so that it effectively covers a scanning $FOV_T$ larger than native $FOV_T$. A scanning Tele camera is described for example in co-owned U.S. Pat. No. 10,578,948.

There is need and it would be beneficial to have methods for using reference image (R image) data and Tele (T) image data to create a new image with a "new" field of view $FOV_N$ that fulfills $FOV_T < FOV_N \leq FOV_R$, wherein the image resolution of the new image $RES_N > RES_R$ and/or wherein the SNR of the new image $SNR_N > SNR_R$.

SUMMARY

In various embodiments, there are provided systems and methods for using reference image data and Tele image data to create a "new" image with a "new" field-of-view $FOV_N$ that fulfills $FOV_T < FOV_N \leq FOV_R$. The new image is a seamless, high resolution, large FOV image. The new image has a resolution $RES_N$ greater than $RES_R$ and/or a signal-to-noise ratio $SNR_N$ greater than $SNR_R$. The new image can be a "super image" ("SI"), obtained by capturing and stitching two or more T images, or it can be a "super-wide image" ("SW"), obtained by capturing and using one or more T images to improve a R image or segments thereof with a super-resolution algorithm.

FIG. 1 illustrates one difference between (a) a known panorama image (or simply "panorama") and (b) a super image disclosed herein. The panorama image has an inherent perspective distortion due to the lack of "ground truth" when correcting points-of-view (POVs) of the different images forming it, while a super image disclosed herein is not distorted.

A SI comprises at least two high resolution Tele images and a R image (with $RES_R < RES_T$) with a large FOV (e.g. $FOV_W$ or $FOV_{UW}$) of the same scene, see FIG. 1(b). That is, a SI uses information regarding the same scene from a larger FOV reference image. In contrast, for creating a panorama as known in the art, in general no reference image is available. In a SI, each captured Tele image is processed and matched to its corresponding location in the larger FOV reference image, thus removing the normal panoramic image perspective distortion. In addition, each Tele image may be checked for capture issues such as focus miss, large amounts of noise, temporary occlusions and more, and, if necessary, is retaken at a later time.

FIG. 2 illustrates another difference between (a) a R image and (c) a SI obtained as disclosed herein. FIG. 2(b) shows the single Tele images used to compose the SI. Since a Tele camera with a large effective focal length (EFL) is used to capture the images, one achieves in the SI (c) a "natural" Bokeh effect. Natural Bokeh is defined as the amount of blurring present in the image data of FOV segments that are not in-focus.

FIG. 3 illustrates yet another difference between a known panorama and a SI obtained as disclosed herein. One can see a scenario where two Tele images, Tele1 and Tele 2, have no information in an overlapping FOV region, but the images are not entirely without information. In this situation, a known panorama will fail to align the images while the SI will be able to align them using a R image.

Other differences between a known panorama and a SI include the ability in the SI acquisition to scan automatically, thereby enabling to determine the scanning position and order of the Tele camera in an educated fashion; the ability to detect and correct bad images; and increased robustness due to higher overlap with the ground truth instead of overlap between different Tele images, which requires a smaller amount of images to cover a desired FOV, since the overlap size demand between the Tele images is reduced.

In various embodiments, there is provided a method, comprising: providing a folded Tele camera configured to scan and capture a plurality of Tele images, each captured image having a $RES_T$, a $SNR_T$ and a $FOV_T$; obtaining and analyzing a R image with $FOV_R > FOV_T$ and with an image resolution $RES_R < RES_T$, and/or a R image with $SNR_R < SNR_T$; determining an order of one or more scanning $FOV_T$ positions for consecutive captures of the Tele images; capturing a Tele image at each respective scanning $FOV_T$ position; aligning the captured Tele images with segments of the R image to obtain aligned Tele images that are aligned with the R image; and using the aligned Tele images and the R image to create a new image having a field of view $FOV_N \leq FOV_R$, wherein the image resolution of the new image $RES_N > RES_R$ and/or wherein the SNR of the new image $SNR_N > SNR_R$.

In some embodiments, the R image is a Wide image having a $FOV_W > FOV_T$, the Wide image captured by a Wide camera included a multi-camera together with the folded Tele camera.

In some embodiments, the R image is an Ultra-Wide image having $FOV_{UW}>FOV_W>FOV_T$, the Ultra-Wide image captured by an Ultra-Wide camera included in a multi-camera together with the folded Tele camera.

In some embodiments, a method further comprises aligning each Tele image with the R image immediately after its capture and prior to the capture of an immediately following Tele image, analyzing each Tele image for faults, and if faults are detected in the Tele image, re-capturing the Tele image at a same $FOV_T$ position, or, if faults are not detected in the Tele image, proceeding to capture an immediately following Tele image at a respective $FOV_T$ position.

In some embodiments, a method further comprises analyzing the aligned Tele images for faults, and if faults are detected in a particular Tele image, re-capturing the particular Tele image at a same $FOV_T$ position, or, if faults are not detected, using the aligned Tele images and the R image to create the new image.

In some embodiments, the folded Tele camera captures two or more Tele images at two or more respective $FOV_T$ positions within $FOV_R$, and the aligned Tele images are composed to create a super image.

In some embodiments, the aligned Tele images and the R image are fed into an algorithm to create a super wide (SW) image having a field of view $FOV_{SW}$, wherein a FOV segment within $FOV_R$ included in at least one $FOV_T$ of the captured Tele images has a field-of-view union-$FOV_T$ and wherein union-$FOV_T<FOV_{SW}<FOV_R$.

In some embodiments, the folded Tele camera is a multi-zoom Tele camera having different zoom states for capturing Tele images having different respective zoom factors.

In some embodiments, the obtaining of the R image includes obtaining the R image from the Internet, from a cloud database, or from an Internet of Things device.

In some embodiments, a video stream formed by a sequence of a plurality of new images is output instead of single new image.

In some embodiments, a user or an algorithm selects a size of $FOV_N$ and a position of $FOV_N$ within a scene included in $FOV_R$.

In some embodiments, the analyzing of the R image includes using a saliency map of the R image for automatically selecting the scanning $FOV_T$ positions and/or automatically selecting the $FOV_N$.

In some embodiments, the aligning of the captured Tele images to obtain a plurality of aligned Tele images includes localizing the T image data with respect to the R image data.

In some embodiments, the Tele camera has an effective focal length of 7-10 mm, of 10-20 mm, or of 20-40 mm.

In some embodiments, the determining an order of one or more scanning $FOV_T$ positions is performed so that each of the one and more Tele images exhibits a specific amount of natural Bokeh.

In some embodiments, the determining an order of one or more scanning $FOV_T$ positions is performed so that a composed new image covers a maximal FOV according to a mechanical limitation of the scanning.

In some embodiments, the determining an order of one or more scanning $FOV_T$ positions is performed so that the new image covers a region of interest selected by a user or by an algorithm.

In some embodiments, the determining an order of one or more scanning $FOV_T$ positions is performed so that each T images include scene segments having a specific depth range or include scene segments that do not exceed a specific depth threshold.

In some embodiments, the determining an order of one or more scanning $FOV_T$ positions is performed so that moving objects are captured first, and after the moving objects are captured, stationary objects are captured.

In some embodiments, the determining an order of one or more scanning $FOV_T$ positions is performed so that a desired coverage of $FOV_R$ with a plurality of $FOV_T$ is performed in a fastest manner.

In some embodiments, the determining an order of one or more scanning $FOV_T$ positions includes determining an order to follow a moving object with an object tracker.

In some embodiments, the determining an order of one or more scanning $FOV_T$ positions includes capturing an object in a Tele image with specific $FOV_T$ to improve RES or SNR of a similar object included in $FOV_N$ but not included in the specific $FOV_T$.

In some embodiments, the determining an order of one or more scanning $FOV_T$ positions includes capturing a moving object with more than one $FOV_T$ at two significantly different points in time.

In some embodiments, $FOV_N>FOV_T$.

In some embodiments, the Tele images are additionally aligned with respect to each other to obtain aligned Tele images that are aligned with the R image and with each other.

In some embodiments, the R image includes a plurality of Wide images.

In some embodiments, the scanning Tele camera covers a scanning range larger than 25% of $FOV_W$ and/or $FOV_{UW}$ or larger than 50% of $FOV_W$ and/or $FOV_{UW}$.

In some embodiments, the scanning Tele camera resolution $RES_T>2\times RES_W$ and/or $SNR_T>2\times SNR_W$, or $RES_T>4\times RES_W$ and/or $SNR_T>4\times SNR_W$.

In some embodiments, the faults are selected from the group consisting of motion blur, electronic noise, rolling shutter, defocus blur and incorrect image alignment or obstructions. In some embodiments, the faults are mechanical faults.

In some embodiments, the composing the aligned Tele images into the super image includes composing the aligned Tele images together with the R image into the super image.

In some embodiments, the determining an order of two or more $FOV_T$ positions is performed so that capturing a minimal number of T images is required.

In some embodiments, the determining an order of two or more $FOV_T$ positions is performed so that Tele images including specific scene characteristics within their respective $FOV_T$s may be captured consecutively, and wherein the scene characteristics may be visual data such as texture or physical data such as brightness, depth or spectroscopic composition of a scene.

In some embodiments, the determining an order of two or more scanning $FOV_T$ positions is performed so that a moving object is removed from a scene included in $FOV_R$.

In some embodiments, the determining an order of two or more scanning $FOV_T$ positions is performed to create a duplication of a moving object in a scene included in $FOV_R$.

In some embodiments, the determining an order of two or more scanning $FOV_T$ positions is performed so that each Tele image overlaps with another Tele image.

In some embodiments, the determining an order of two or more scanning $FOV_T$ positions is performed so that one or more objects of interest are located in a center region of a $FOV_T$ and not in an overlap region.

In some embodiments, the multi-zoom Tele camera is a continuous-zoom Tele camera. In some embodiments, the multi-zoom Tele camera is a dual-zoom-state Tele camera.

In some embodiments, the R image is a Tele image having a first ZF (ZF1) and the Tele images that are captured consecutively according to the scanning order have a second zoom factor (ZF2), wherein ZF1≤1.25×ZF2.

A method disclosed herein is not limited to a specific multi-camera module, and could be used for any combination of cameras as long as the combination consists of at least one camera with some scanning capabilities, not limited to 2D scanning.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. If identical elements are shown but numbered in only one figure, it is assumed that they have the same number in all figures in which they appear. The drawings and descriptions are meant to illuminate and clarify embodiments disclosed herein and should not be considered limiting in any way. In the drawings.

DETAILED DESCRIPTION

Figure 1:
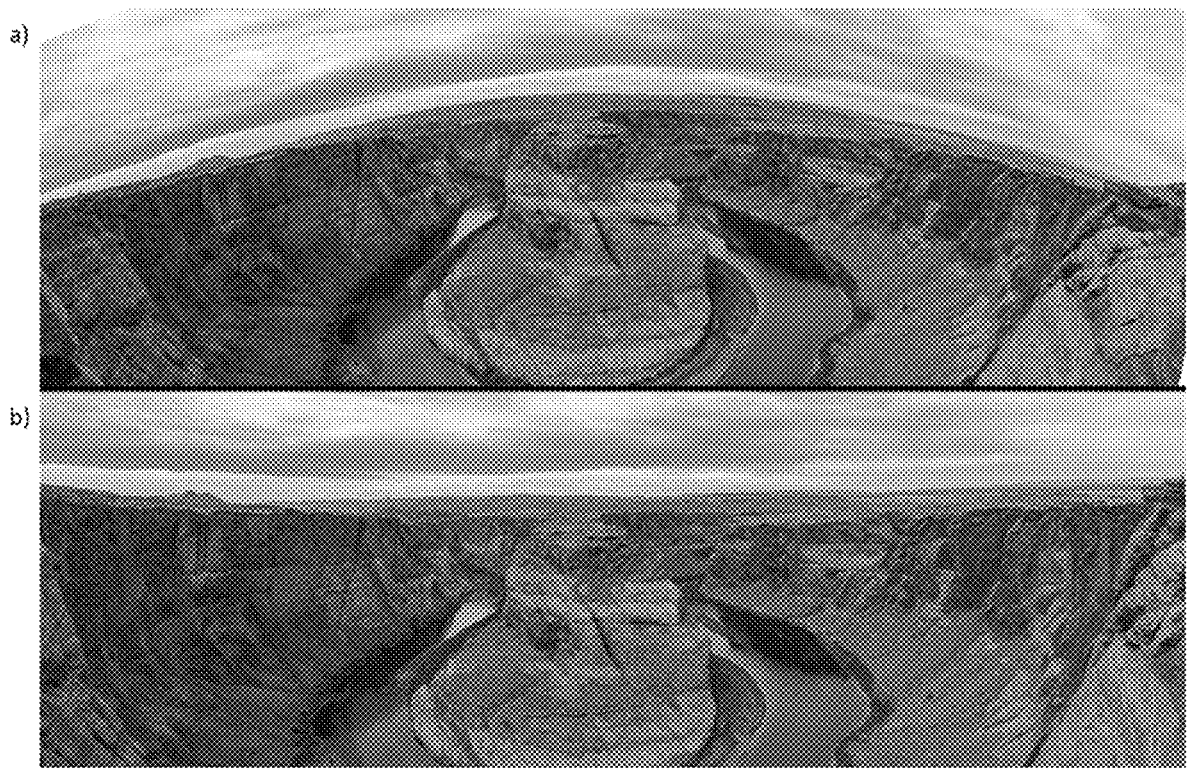
FIG. 1 illustrates a key difference between (a) a regular panorama image and (b) a super image.
Figure 2:
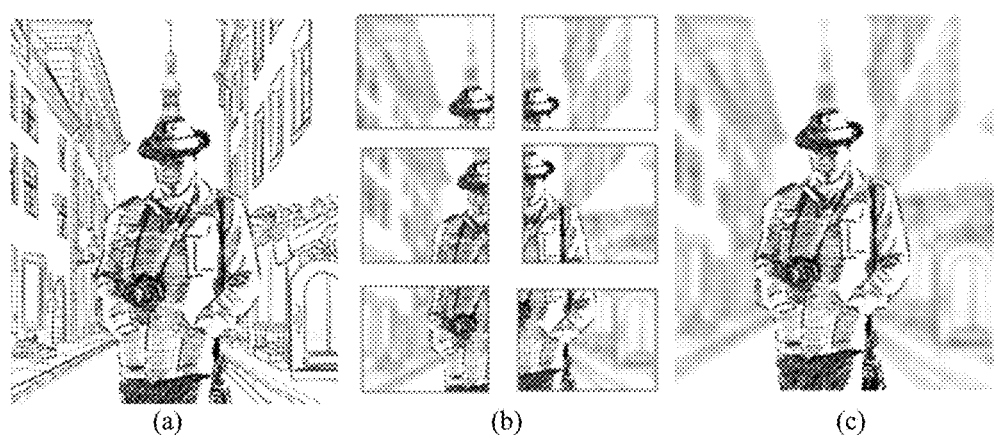
FIG. 2 illustrates another key difference between a regular panorama image and a super image obtained as disclosed herein.
Figure 3:
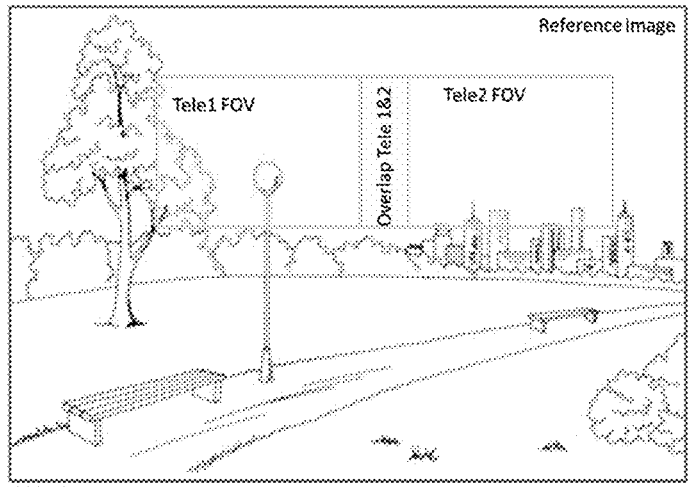
FIG. 3 illustrates yet another key difference between a regular panorama image and a super image obtained as disclosed herein.
Figure 4A:
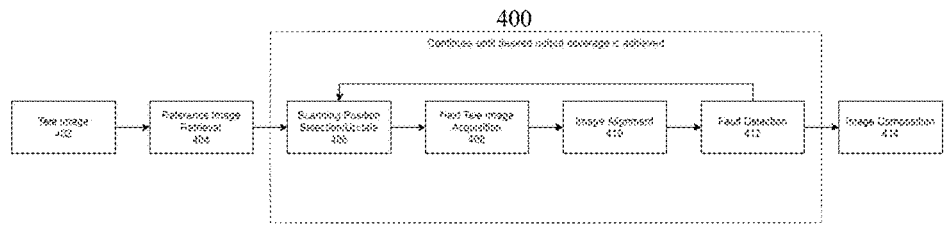
FIG. 4A shows a flow chart of method embodiments for obtaining a new image disclosed herein.
Figure 17:
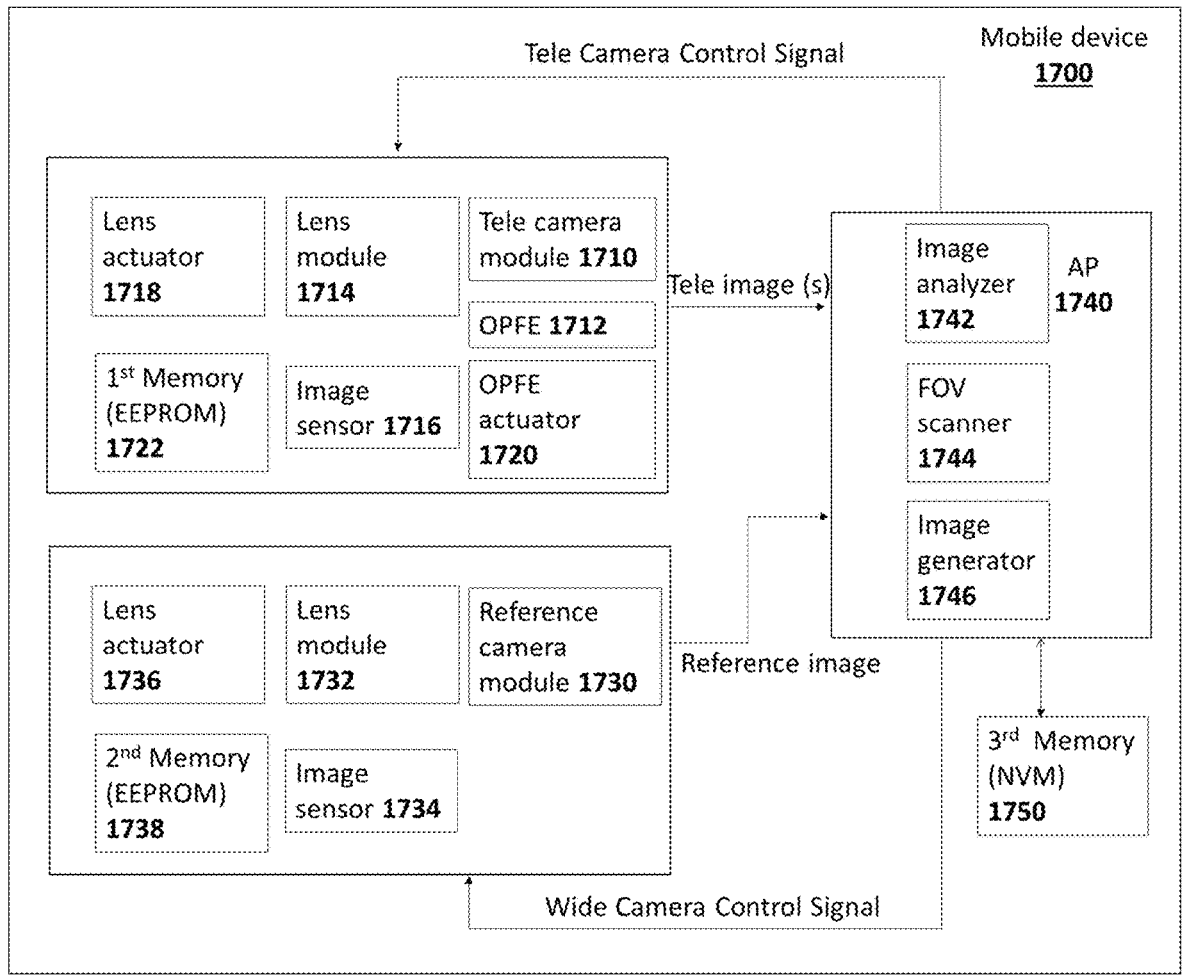
FIG. 17 shows schematically an embodiment of a mobile device that includes multi-aperture cameras with at least one scanning Tele camera.

Returning now to the figures, FIG. 4A shows a flow chart of method embodiments for obtaining a new image with $RES_N > RES_R$ and/or $SNR_N > SNR_R$ disclosed herein. A first method may be referred to as Super-Image method (or "SIM") for creating a super-image as described herein (for SI composition see FIG. 15A). A second method may be referred to as Super-Wide image method (or "SWM") for creating a super-wide image as described herein (for SW composition see FIG. 15B). An algorithm performing the methods may run on a processor such as Application processor (AP) 1740 operatively coupled to a first (R) camera and a second (Tele) camera, as shown in FIG. 17. In some embodiments for obtaining a SI, an initial Tele image at an initial scanning position is captured in step 402. A R image is retrieved in step 404. In some embodiments, the R image is a W image or an UW image taken with respective cameras. In some embodiments, the R image is taken at a significantly different time than the Tele images captured in step 402 and/or 408, e.g. few seconds, hours or even years before the capturing of the Tele images. In other embodiments, the R image is retrieved from an external database using the initial Tele image as a query, see below. A next (also referred to as "subsequent", "sequential" or "consecutive") scanning position of the Tele camera, determining a respective $FOV_T$, is selected or updated after the initial and each subsequent Tele image capture in step 406.

In step 408, a subsequent Tele image is acquired (captured) using the scanning position selected or updated in step 406. For a SIM, the subsequently acquired Tele image is aligned with previously found Tele images that have some shared FOV and with the R image in step 410 to obtain an aligned Tele image. For a SWM, the subsequently acquired Tele image is aligned with the R image in step 410 to obtain an aligned Tele image. The aligned Tele image is analyzed for faults in step 412 and, based on the detected faults, a subsequent scanning position is updated by returning to step 406. Steps 406-412 are repeated until the desired coverage of the R image has been achieved. Afterwards, the SI or SW are composed as described in FIG. 15A for SIM and in FIG. 15B for SWM in step 414 to form one cohesive new image with $FOV_N > FOV_T$ and $RES_N > RES_T$ and/or $SNR_N > SNR_T$, which can be a SI or a SW.

In some embodiments, image composition step 414 may be performed after all the Tele images are acquired and aligned as described above. In other embodiments, image composition step 414 may be performed after each iteration of Tele image acquisition and image alignment steps 406-412, to perform "on the fly" blending with intermediate viable results. In such embodiments, a SI exists after each iteration of steps 406-412.

Figure 4B:
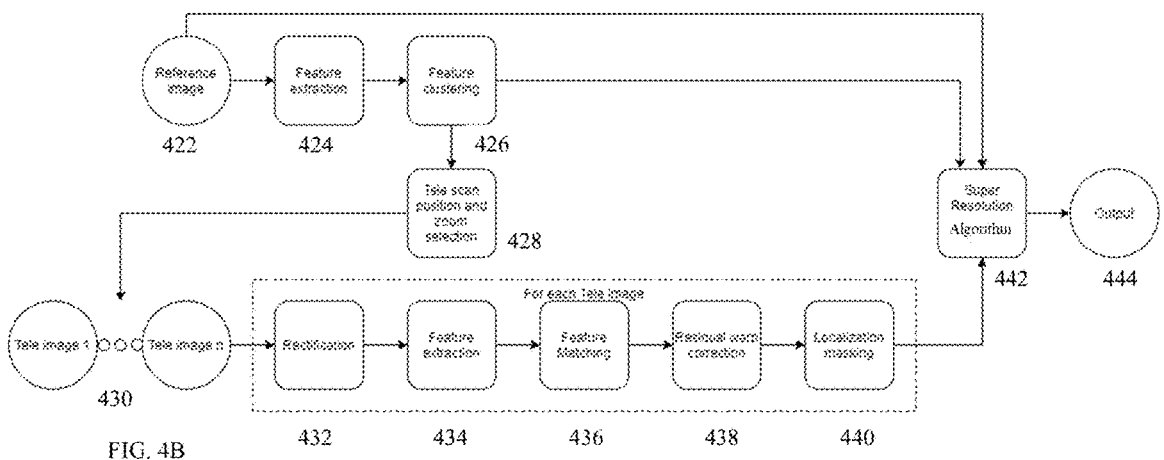
FIG. 4B shows a flow chart of SWM embodiments for obtaining a new image, wherein the new image is a SW disclosed herein.

FIG. 4B shows a flow chart of SWM embodiments for obtaining a new image with $RES_N>RES_R$ and/or $SNR_N>SNR_R$ wherein the new image is a SW disclosed herein. An algorithm performing the methods may run on AP 1740 operatively coupled to a first (R) camera and a second (Tele) camera, as shown in FIG. 17. In step 422, a R image is retrieved. In step 424, features present in the R image are extracted as known in the art and clustered in 426. The features may be clustered by their distance from the mobile device 1700, or by their location within the R image's FOV or otherwise, e.g. by their similarity in a semantic sense, e.g. by semi-image segmentation such as "SLIC Superpixels" described by Radhakrishna Achanta, Appu Shaji, Kevin Smith, Aure-lien Lucchi, Pascal Fua, and Sabine Susstrunk, SLIC Superpixels, EPFL TechnicalReport 149300, June 2010. Based on the result of the clustering, in step 428 a T scanning order is determined. Optionally and in case that T camera 1710 is a multi-zoom T camera having different zoom states, additionally a suitable zoom factor (ZF) may be determined. Examples for a T scanning order are given in FIG. 12C-D. In step 430, T images are captured according to the T scanning order determined in step 428.

Steps 432-440 describe the process of aligning the T images captured in step 430 with the R image retrieved in step 422. Further details on the image alignment are described in FIG. 13. As known in the art, T images captured with a scanning T camera based on 1 OPFE undergo a "Roll effect", so that they are rectified in step 432. Features in the T images are extracted in step 434. For each T image, the features extracted in step 434 are matched with the features in R image that were extracted in step 424. Steps 438-440 describe the fine-tuning of the alignment process. In step 438, in case the rectification performed in step 432 was found to be insufficient in step 436, the T image is additionally adjusted in terms of warping for reducing Roll effect. In step 440, a localization of the T image data with respect to the R image data is performed. For example, a cross correlation calculation as known in the art may be performed for localizing the T image data within the R image. As an example and typically, before the localization, image points of a same object point may e.g. deviate by more than 25 pixels or by more than 50 pixels or by more than 100 pixels between the R and T images. We assume a pixel size of about 1 µm. After the localization, image points of a same object point may e.g. deviate by less than 20 pixels or by less than 10 pixels or even by less than 2 pixels between the R and T images. For SWM, it may not be required to align the T images with respect to each other, but each T image may be aligned with the R image only.

In step 442, the R image and the aligned T images are fed into a super-resolution algorithm. Relevant super-resolution algorithms are described for example in Daniel Glasner et al., "Super-Resolution from a Single Image", ICCV, 2009, Tamar Rott Shaham et al., "SinGAN: Learning a Generative Model from a Single Natural Image", ICCV, 2019, arXiv: 1905.01164, or Assaf Shocher et al., "Zero-Shot Super-Resolution using Deep Internal Learning", 2017, arXiv: 1712.06087.

A new image having $RES_N>RES_R$ and/or $SNR_N>SNR_R$ is output in step 444. In general, $FOV_N$ is larger than the union of all $FOV_T$s that are fed into the super-resolution algorithm in step 442, i.e. $FOV_N$>union-$FOV_T$. Union-$FOV_T$ represents the FOV within $FOV_R$ which is included in at least one $FOV_T$ of one of the T images captured in step 428.

The $FOV_T$ scanning may be performed by actuating (e.g. for rotation) one or more optical path folding elements (OPFEs) of the scanning Tele camera. Fast actuation may be desired. Actuation may be performed in 2-20 ms for scanning e.g. 2°-5° and in 10-70 ms for scanning 15-25°. A scanning Tele camera may have a maximal diagonal scanning range of 60°. "Maximal diagonal scanning range" is defined by the center of the FOV in the maximum state bottom-left of a center FOV and the center of the FOV in the maximum state top-right of a center FOV. For example and referring to FOV diagonal, a scanning T camera having $FOV_T$=20° and 60° scanning range covers an overall FOV of 80°. A diagonal scanning range of 40° may cover around 60-100% of a $FOV_W$. The scanning Tele camera may have an of EFL=7 mm-40 mm. Typical zoom factors (ZF) may be 2×-10× zoom with respect to a W camera hosted in the same mobile device, meaning that an image of a same object captured at a same distance is projected at a size 2×-10× larger on the image sensor of the T camera than on the W camera. Assuming that a same sensor is used in R camera and T camera, the image resolution scales linearly with the ZF. For same sensors, typically, $RES_T>2\times RES_W$. In some examples, $RES_T>5\times RES_W$.

Figure 5:
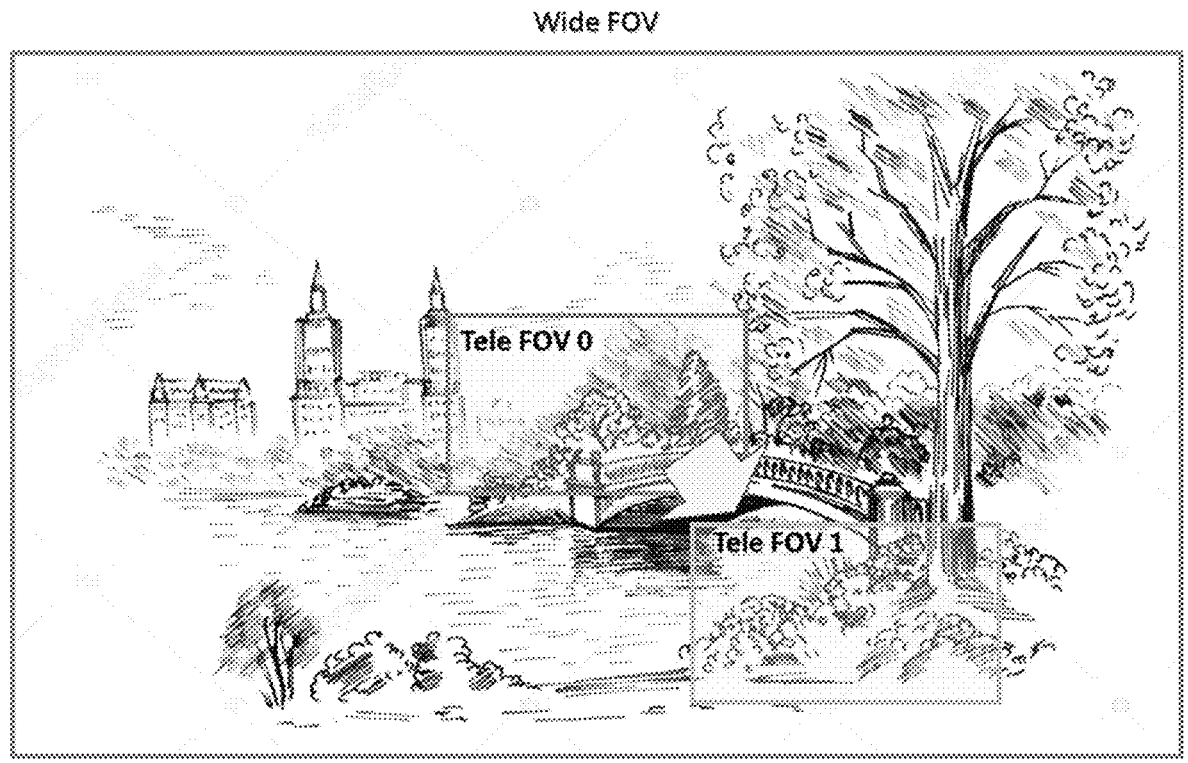
FIG. 5 illustrates the FOVs of dual-camera output images.

FIG. 5 illustrates exemplary FOVs of a dual-camera image, for a dual-camera that comprises for example a W camera (acting as a R camera) and a scanning T camera. Tele FOV 0 shows one exemplary T scanning position superposed on the Wide FOV and FOV 1 shows another exemplary T scanning position superposed on the Wide FOV. Such a setup enables the use of the W image as the R image in step 404.

Figure 6:
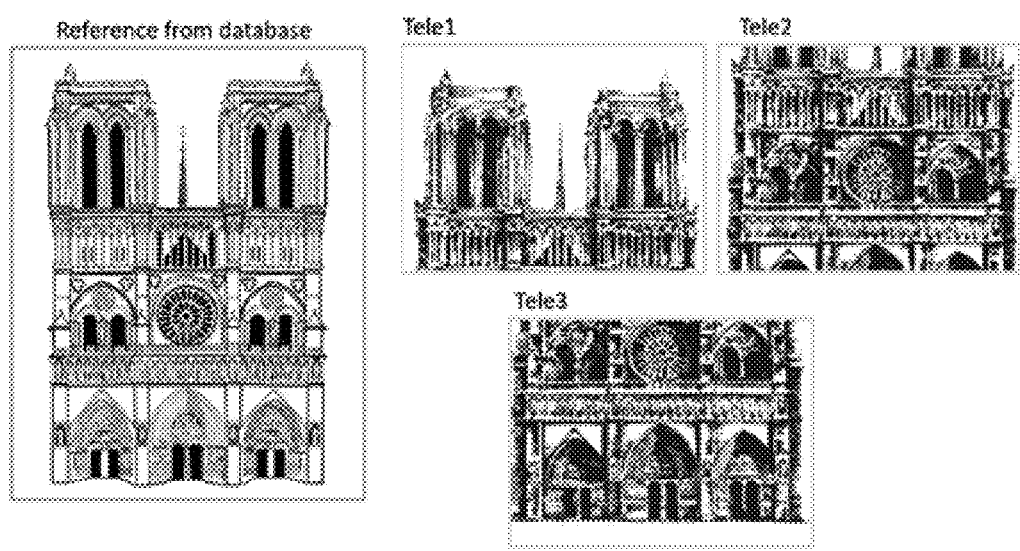
FIG. 6 illustrates an embodiment of a R image retrieval process.

FIG. 6 illustrates an embodiment of a R image retrieval process. Three T images Tele1, Tele2 and Tele3 are acquired in steps 402 and/or 408. These images are then used to search an external database (e.g. using Google) for a similar image, which is then retrieved and used as the R image.

Figure 7:
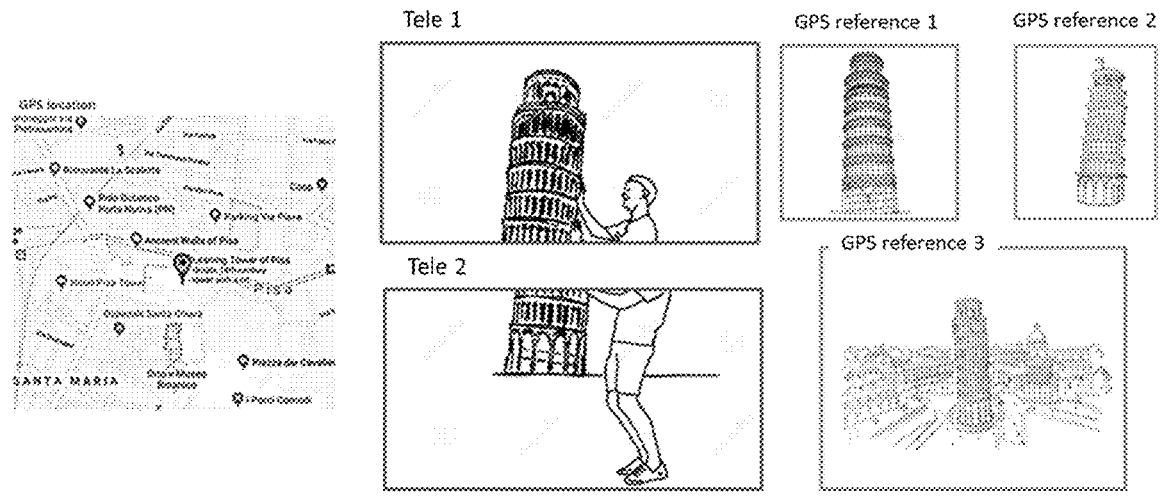
FIG. 7 illustrates another embodiment of a R image retrieval process.

FIG. 7 illustrates another embodiment of a R image retrieval process. Here, the retrieval is performed using GPS location from a mobile device. The figure shows the current mobile device's GPS location and two T images (Tele1 and Tele2) captured in step 402 and/or 408, and "GPS" R images retrieved from an external database using the GPS location as a query.

Figure 8A:
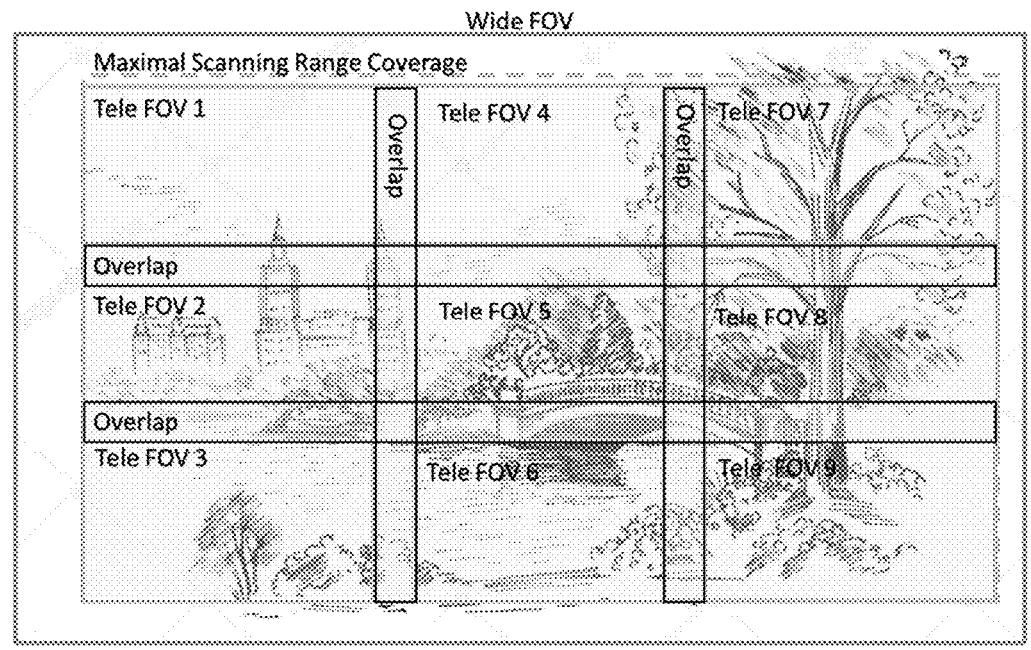
FIG. 8A illustrates an embodiment of Tele scanning order determination for creating a SI or SW.

FIG. 8A illustrates an embodiment of Tele (T) scanning order determination for creating a SI or SW (step 406 or step 428 respectively). The scanning order is indicated by numbering the images from 1-9, i.e. T image 1 having Tele FOV 1 is the first T image captured, T image 2 having Tele FOV 2 is the second T image captured, etc. Here, the scanning positions are determined based on the maximal coverage of the T camera's scan range. The figure shows the maximal possible scanning range coverage of the T camera superimposed on a Wide FOV, and T images with Tele FOVs from FOV1 to FOV9 selected so as to achieve the maximal coverage. For creating a SW, the overlap between the single Tele images 1-9 is optional.

Figure 8B:
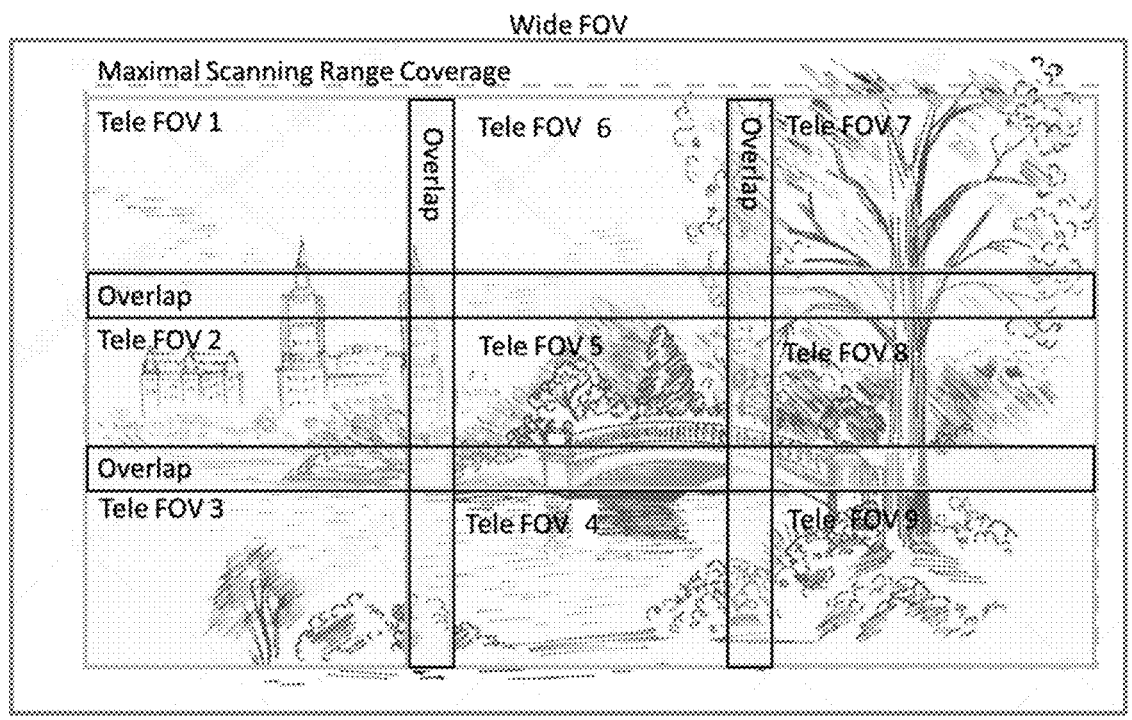
FIG. 8B illustrates another embodiment of determining a Tele scanning order for creating a SI or SW.

FIG. 8B illustrates another embodiment of determining a T scanning order for creating a SI or SW (step 406 or step 428 respectively). The scanning order is indicated by numbering as see FIG. 8A. Here, the scanning positions are determined based on the maximal coverage of the scan range and additionally on capturing this maximal coverage in the shortest overall capture time. The capture time includes consecutively moving $FOV_T$ to the target scanning position and capturing one or more T images at this position. In this embodiment, by minimizing the $FOV_T$ movement between T image 3 having Tele FOV 3 and T image 4, and between T image 6 and T image 7, a shorter overall capture time compared to the scanning order shown in FIG. 8A is achieved.

It is noted that determining a scanning order includes determining the respective $FOV_T$ position, meaning that $FOV_T$ positions and their scanning order are determined.

Figure 9:
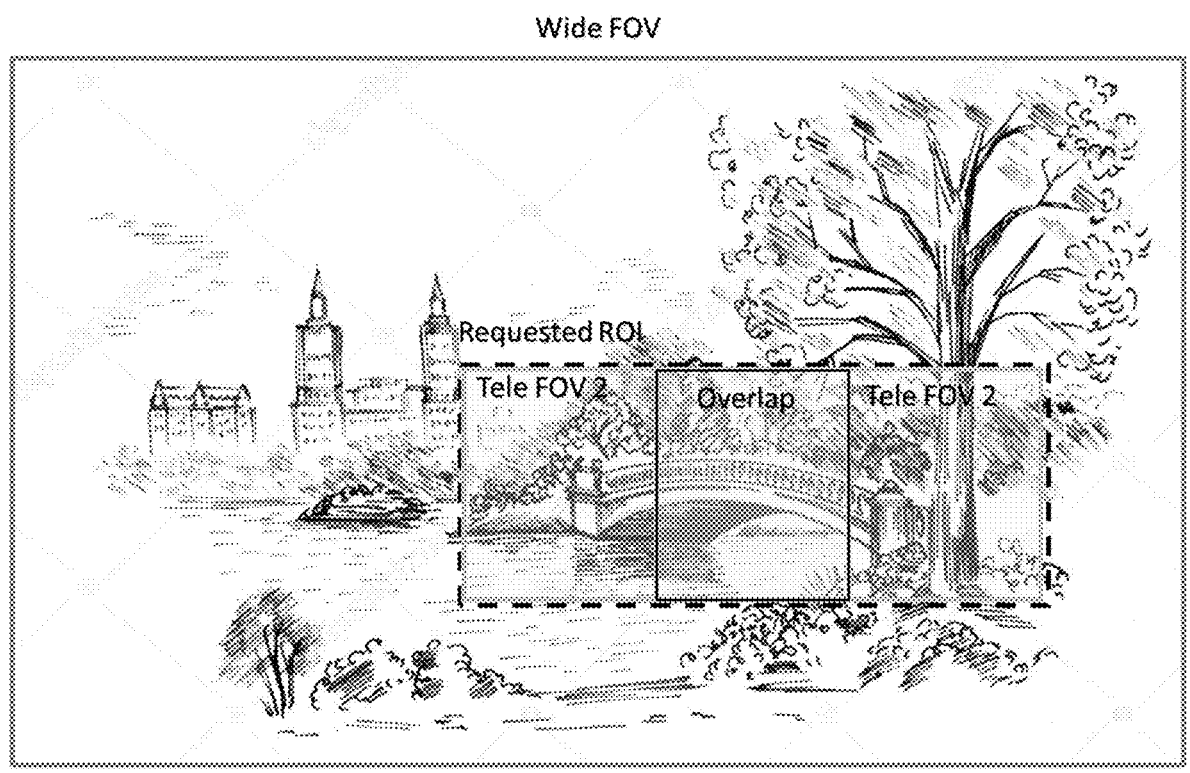
FIG. 9 illustrates determination of Tele FOV positions according to certain criteria.

FIG. 9 illustrates determining Tele FOV positions for creating a SI and or a SW according to the criteria of maximal coverage of a user's region of interest (ROI) choice. The figure shows the user's requested ROI as a dashed rectangle on the Wide (as reference) image FOV and the T images determined so as to achieve the maximal coverage of this ROI choice.

In other embodiments for SIM and SWM, the scanning positions may be determined based on the maximal coverage of an object of interest or ROI as obtained from an algorithm, e.g. from a Saliency map, for example as described in "Salient Object Detection: A Discriminative Regional Feature Integration Approach" by Jiang et al. or as in "You Only Look Once: Unified, Real-Time Object Detection" by Redmon et al. The FOV of a SI or a SW may be selected based on the Saliency map.

In yet other embodiments for SIM, the scanning positions may be determined such that specific features within an ROI are located in a center region of a $FOV_T$ and not in an overlap region. A specific feature may be for example the face of a person. Locating specific features in a center region may avoid stitching artifacts in the SI's FOV segments where the ROI is located, e.g. by applying "stitching seams" in the FOV covered by the specific feature.

In yet other embodiments for SIM and SWM, scanning positions may be determined so that a minimal number of T image captures is required for a given selected ROI covering a particular FOV which is larger than $FOV_T$, e.g. for reducing power consumption and capture time.

In yet other embodiments for SIM and SWM, a criterion for determining an order of scanning position may be based on artistic or visual effects such as e.g. a desired amount of natural Bokeh. The amount of natural Bokeh depends on differences in the object-lens distance of foreground objects (in-focus) and background objects (out-of-focus). A scanning position criterion may e.g. be an image background with uniform natural Bokeh.

In yet other embodiments for SIM and SWM, a criterion for determining an order of scanning position may be based on desired data for computational photography. Such data may be for example stereo image data including T image data and image data from the R image. From stereo image data of a single $FOV_T$ and the overlapping image FOV segment of the $FOV_R$, a stereo depth map covering $FOV_T$ may be calculated as known in the art, e.g. by triangulation. The stereo depth map may enable application of artificial Bokeh algorithms to the R image or to the SI. In some embodiments, the SI output in step 414 may not be an image including visual data, but an output that includes stereo depth data.

In other embodiments, a scanning order criterion may include desired artistic SI effects. Such effects may be created by synchronizing T image capture and FOV scanning, wherein capture happens during FOV movement, so that a motion blur effect in the T image is achieved. For this, a scanning order criterion may be a desired amount of motion blur of a specific scene segment.

In yet other embodiments for SIM and SWM, a criterion for scanning position determination may be based on a depth estimation of the scene included in the R image. For example, one may select scanning positions so that single T images include scene segments having a specific depth range (i.e. a specific camera-object distance range) or include scene segments that do not exceed a specific depth threshold.

In another example, one may select scanning positions so that single T images include ROIs covering a particular FOV size. As an example, a scanning order criterion may be to capture scene segments having similar depths or including ROIs of particular FOV sizes consecutively. This may be beneficial for a scanning camera that may have not one fixed FOV (i.e. zoom state) but different FOVs (zoom states). For fast SI or SW capture, one may prefer to capture FOV segments with identical zoom states consecutively (sequentially), as it may e.g. be desired to minimize number of (time-consuming) zoom state switches. As another example, a scanning order criterion may be to capture scene segments having similar depths consecutively, because this may minimize the amount of time required for re-focusing the T camera between single T image captures and may also facilitate the alignment of the T images.

In yet another embodiment for SIM and SWM, a scanning order criterion may be that T images comprising specific scene characteristics within their respective $FOV_T$s may be captured consecutively. In some embodiments, T images with similar scene characteristics within their respective $FOV_T$s may be captured consecutively. Scene characteristics may be visual data such as texture. Scene characteristics may be physical data such as brightness, depth or spectroscopic composition of a scene. A spectroscopic composition may be defined by the intensity values of all wavelengths present in the scene.

FIGS. 10A, 10B, 11A, 111B, 12A and 12B illustrate three examples for criteria for determining a T scanning order for creating a SI based on the information related to a moving object (a runner, the arrow in FIG. 11A indicating the direction of her movement) in the scene. Views A in each figure show the T scanning order in a flow chart (arrows 1, 2, 3). View B in each figure shows the resulting SI. There are several options for determining a T scanning order, as follows.

Figure 10A:
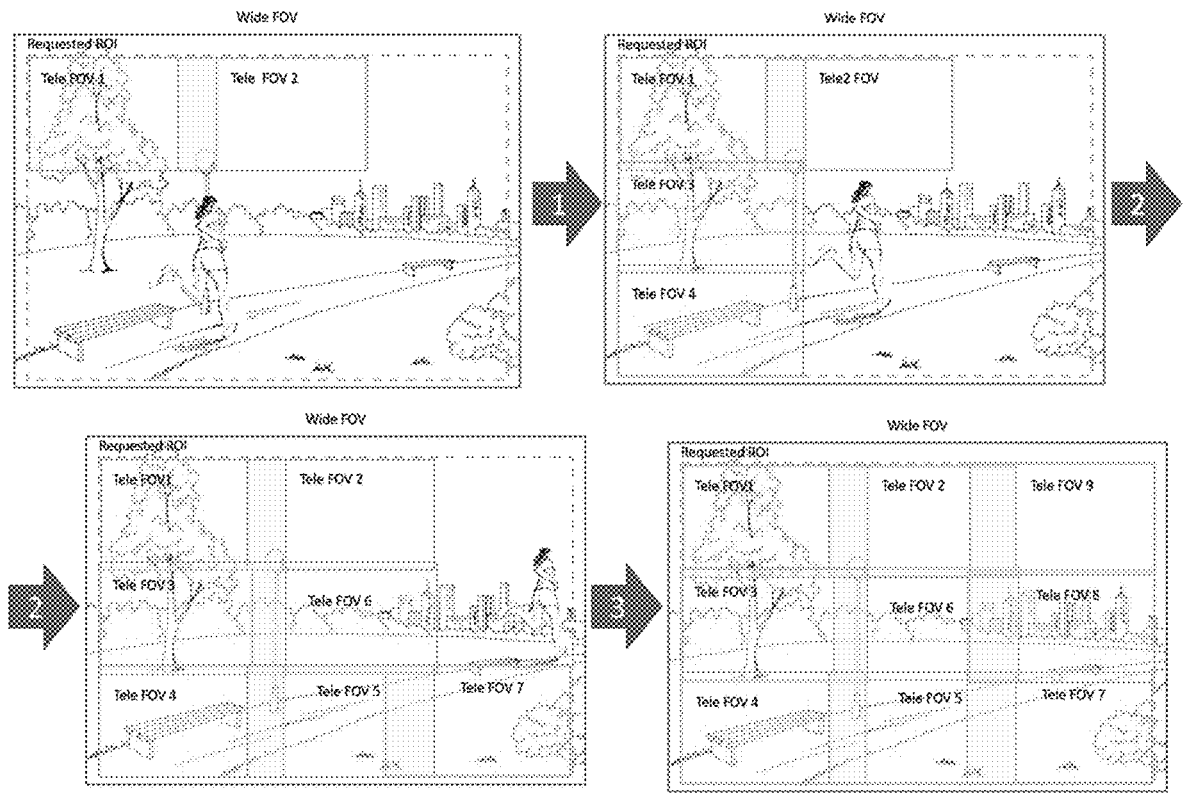
FIG. 10A illustrates Tele camera scanning order in an embodiment of Tele scanning order determination based on the detection of a moving object in a scene.
Figure 10B:
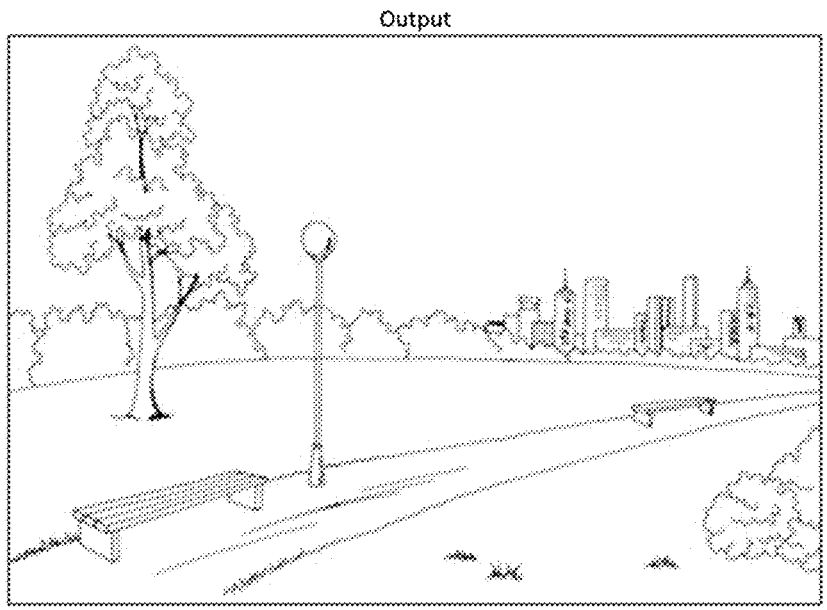
FIG. 10B illustrates a super image resulting for the scanning in FIG. 10A.
Figure 11A:
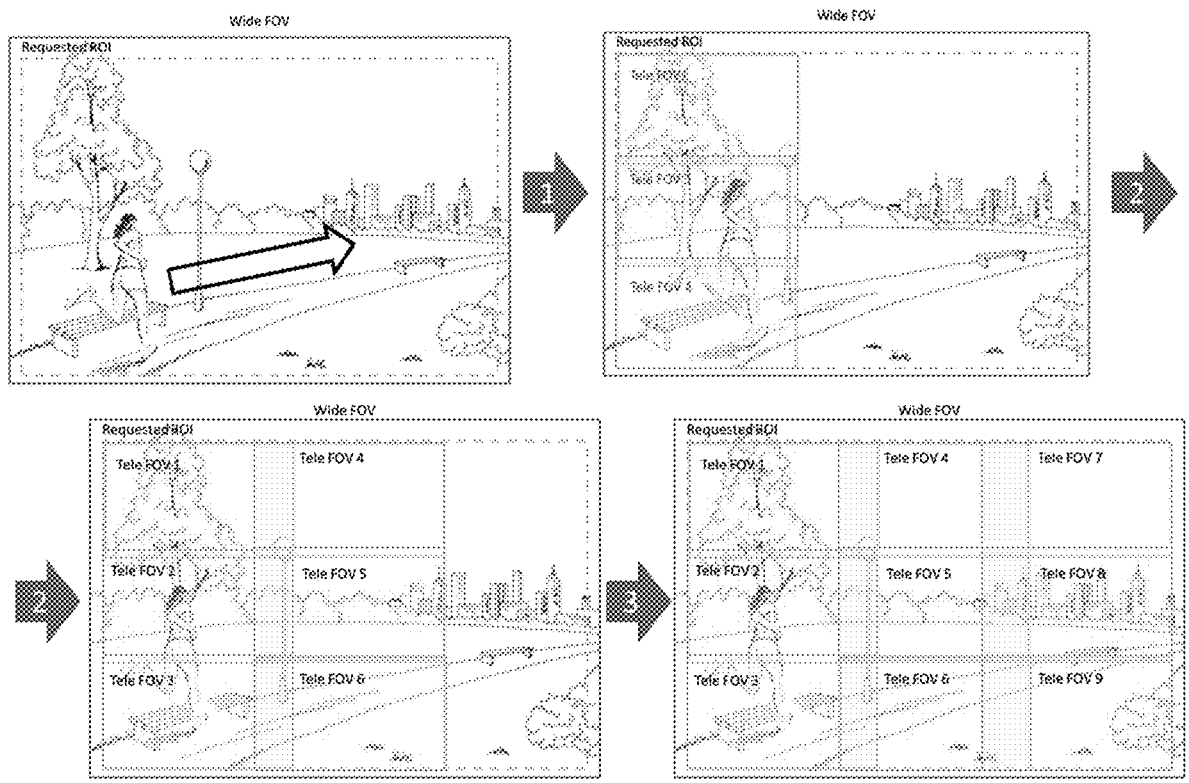
FIG. 11A illustrates Tele camera scanning order in another embodiment of Tele scanning order determination based on the detection of a moving object in a scene.
Figure 11B:
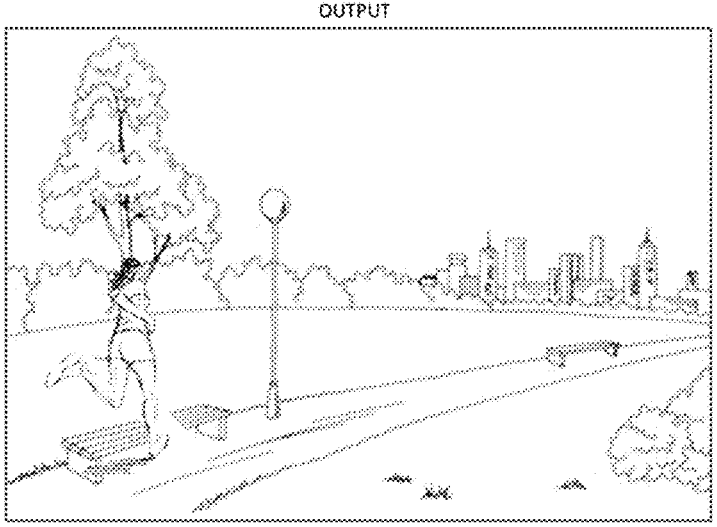
FIG. 11B illustrates a super image resulting for the scanning in FIG. 11A.

One can determine the order of capturing the T images such that the moving object will not appear in the scene at all, as illustrated in FIG. 10A. Alternatively, one can determine the T scanning order such that the moving object will appear in the scene only once, as illustrated in FIG. 11A. Further alternatively, one can determine the T scanning order to create duplication of the moving object in the scene as illustrated in FIG. 12A.

The T scanning order (i.e. the scanning order criteria) may alternatively be based on camera or scene properties. In some embodiments, a scanning order criterion may be based on fast SI capture. In some embodiments, the SI output in step 414 or the SW output in step 444 may not be an image including visual data, but it may be an output including spectroscopic data, stereo depth data or other image data that is generated by computational photography or physical analysis.

In some embodiments, a plurality of sub-SIs that form a single SI may be captured in the FOV of a R image simultaneously, i.e. in a single capture process as described in FIG. 4. A sub-SI is defined by being a part of a single SI, wherein the single SI covers a larger FOV of a scene than the sub-SI. A sub-SI has no FOV overlap with respect to all other sub-SIs. A scanning order criterion for capturing the single SI may be fast SI capture. Fast SI capture may be achieved by minimizing delay time between the capture of single T images caused by OPFE actuation. In other embodiments, a scanning order criterion for capturing the single SI may be fast capture of the specific sub-SI that comprises the fastest moving object in the scene of the single SI.

Figure 12A:
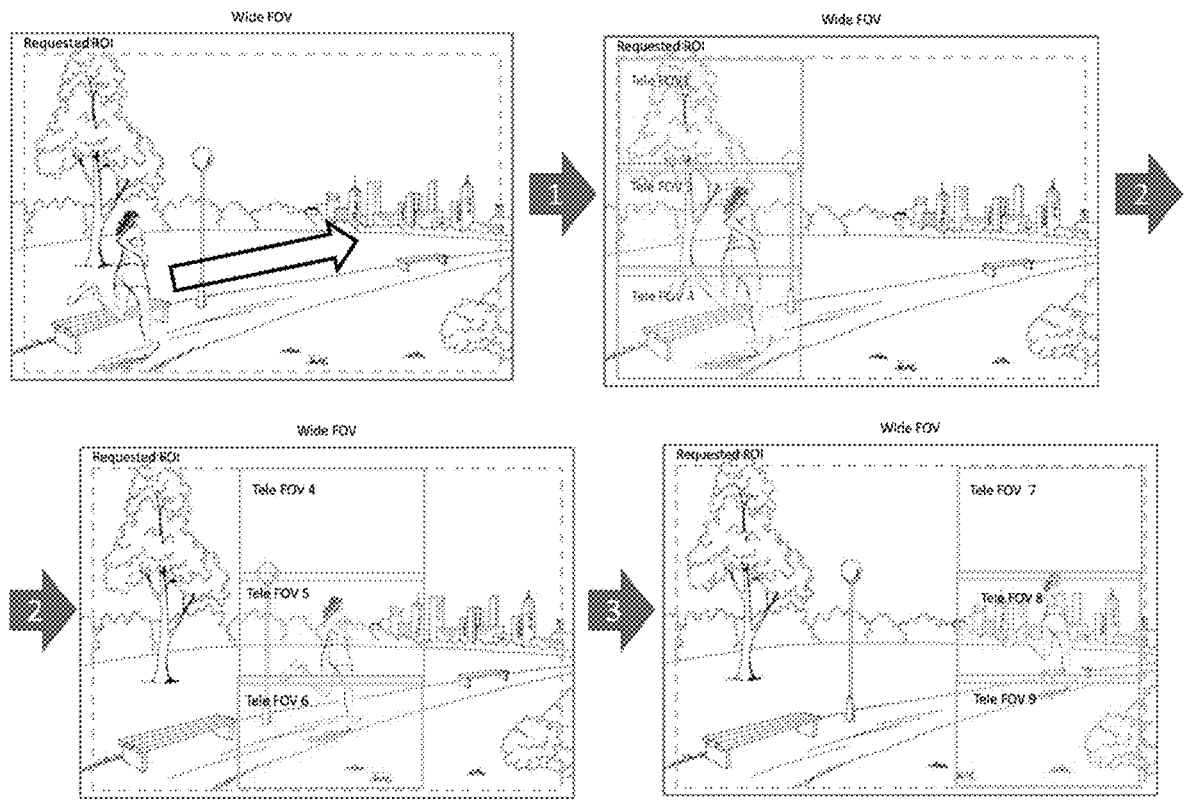
FIG. 12A illustrates Tele camera scanning order in yet another embodiment of Tele scanning order determination based on the detection of a moving object in a scene.
Figure 12B:
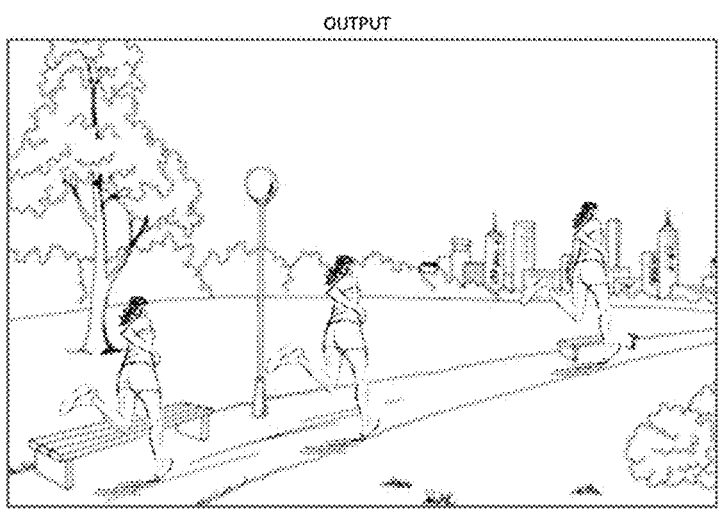
FIG. 12B illustrates a super image resulting for the scanning in FIG. 12A.
Figure 12C:
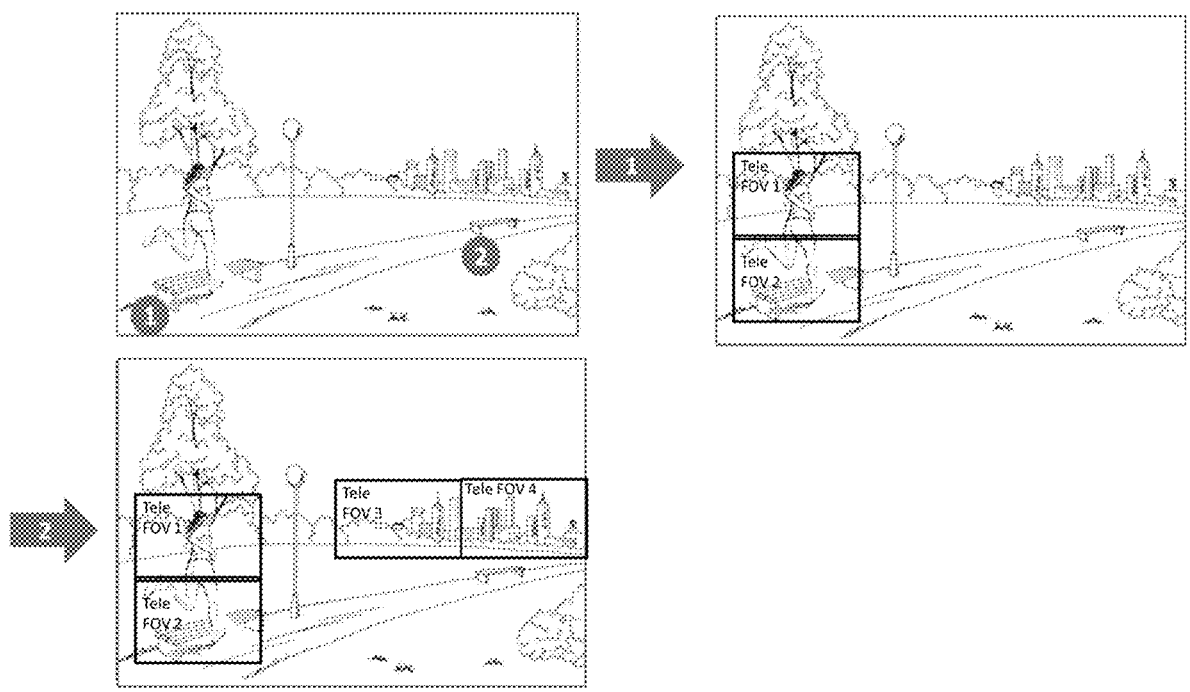
FIG. 12C shows a first example of a T scanning order that prioritizes capturing moving objects over stationary objects.
Figure 12D:
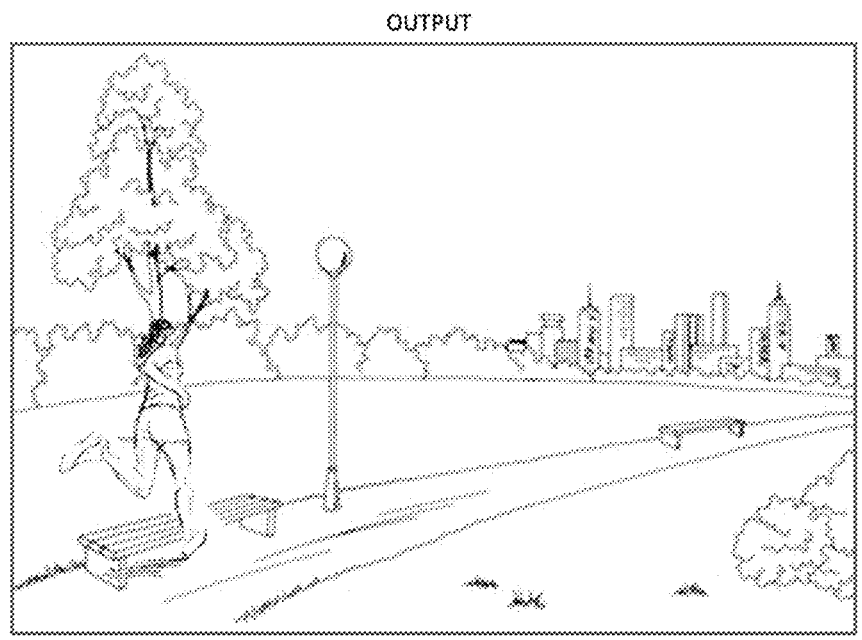
FIG. 12D shows a SW resulting from the scanning order in FIG. 12C.

FIGS. 12C-12D show the same scene shown in FIGS. 10A, 11A and 12A. FIG. 12C shows the T scanning order in a flow chart. FIG. 12D shows the resulting SW.

In contrast with SIM, in a SWM for increasing RES or SNR in a segment of $FOV_R$ one must not necessarily capture a T image having a $FOV_T$ that includes this very $FOV_R$ segment. It may be sufficient to capture a T image that includes similar features present in the same scene. As an example and with reference to FIG. 12C, for increasing RES or SNR in a segment of $FOV_R$ that includes bench 2 (marked "2" in FIG. 12C), it may be sufficient to use a T image that includes bench 1 (marked "1" in FIG. 12C), as bench 1 is an object that is similar to bench 2. Similarly, one may use a T image including a segment of the meadow appearing in Tele FOV 3 to increase the resolution of the new image at a location that is e.g. included in Tele FOV4, but not in Tele FOV 3.

Furthermore, for SWM the T images must not necessarily be aligned with each other, but only with the R image. Therefore, the captured T images must not necessarily include an overlapping FOV, which is required for SIM.

There are several options for determining a T scanning order, as follows.

FIG. 12C shows a first example of a T scanning order that prioritizes capturing moving objects (such as the runner) over stationary objects (such as the city landscape). In other examples, a first Tele FOV1 may be capture such as shown here, but a second Tele FOV2 that may still include the legs of the runner may be captured at a significantly later time, e.g. when the runner moved already to another position. A "significantly later time" may be for example a time that is 100 ms later or 250 ms later or 500 ms later or even later than that, e.g. is later. In this example, one may follow an object with an object tracker for capturing a T image.

In another example, a T scanning order is determined so that a desired coverage of $FOV_R$ with a plurality of $FOV_T$ is performed in a fastest manner.

In yet another example and for a Tele camera which is a multi-zoom camera, a T scanning order is determined so that a desired coverage of $FOV_R$ with a desired zoom factor (ZF) is performed in a fastest manner. A user or an algorithm may select the desired ZF. One criterion for selecting the ZF may be a desired ratio of $RES_T/RES_R$ and/or of $SNR_T/SNR_R$, another criterion may be a desired $FOV_T$. In some embodiments, the R image may be a Tele image which is captured with a first ZF (ZF1) and the Tele images that are captured consecutively according to the order have a second ZF (ZF2), wherein ZF1<ZF2, for example ZF1≤1.1×ZF2, ZF1≤1.25×ZF2, ZF1≤2×ZF2.

In yet another example and for a Tele camera which is a multi-zoom camera, a T scanning order is determined so that Tele images with a same ZF are captured consecutively. For example, first all Tele images with a particular first ZF (ZF1) are captured, and afterwards all Tele images with a particular second ZF (ZF2) are captured.

Figure 13:
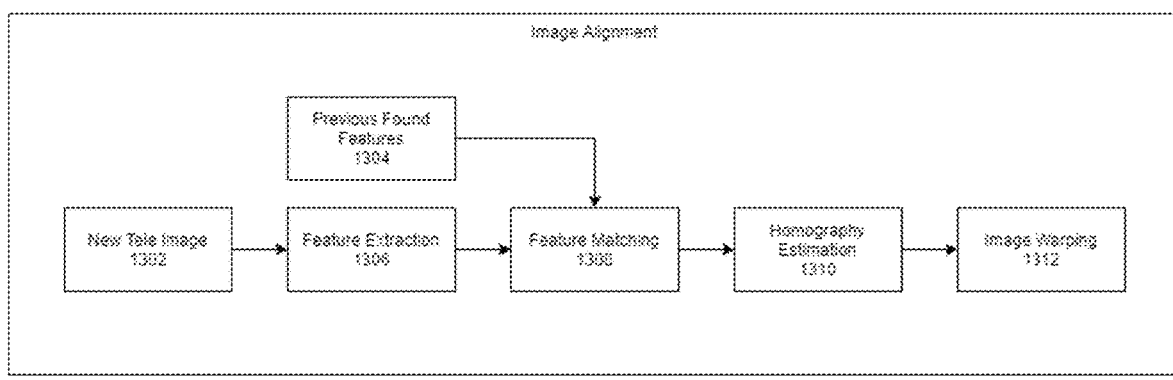
FIG. 13 is a flow chart showing details of a typical setup of the image alignment step.

FIG. 13 is a flow chart showing details of a typical setup of image alignment step 410 for creating a SI or steps 432-440 for creating a SW. The inputs to these steps are the newly captured T image, the previously found features from all the T images captured thus far, and the R image (sub-steps 1302-1304). A feature extraction sub-step 1306 is followed closely by a feature matching sub-step 1308. These procedures can be such as described in, but not limited to, "ORB: an efficient alternative to SIFT or SURF" by Rublee et al., International Conference on Computer Science, 2011, or as in any other feature scheme. Next is a homography estimation sub-step 1310, such as described in, but not limited to, "Computing homography with RANSAC algorithm: A novel method of registration" by Li et al., Proceedings of SPIE—The International Society for Optical Engineering, January 2004, or as in any other homography estimation algorithm. In some embodiments, not a homography estimation may be used, but some other geometric transformation, e.g. an affine transformation or a non-affine transformation. A sub-step 1312 performs image warping according to the homography found in sub-step 1310 to align the resulting T image. In some embodiments, the image alignment is done at first between T images, while using the R image after the alignment for fine-tuning. In other embodiments, the image alignment may be done with each T image aligned to the R image while using the different T image matchings for fine-tuning, or by other combinations of image alignments between the different images. In some embodiments, a localization step such as described in step 440 may be performed.

Figure 14:
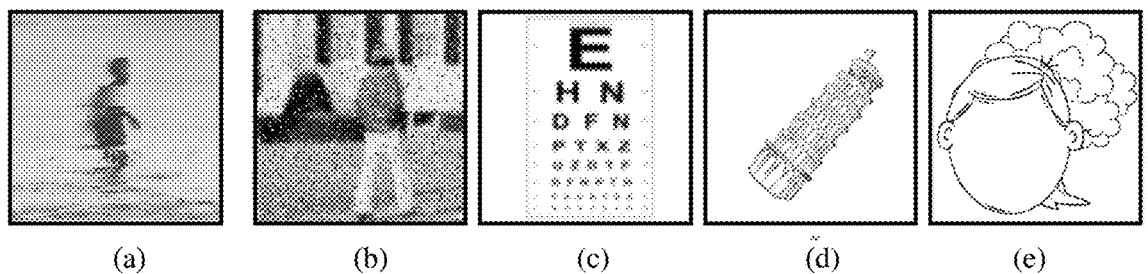
FIG. 14 illustrates a few cases in which the fault detection step will raise an error.

FIG. 14 illustrates a few cases in which fault detection step 412 will raise an error. The cases include, but are not limited to, (a) motion blur, (b) electronic noise, (c) defocus blur, (d) rolling shutter artifacts, (e) incorrect image alignment (failure of the image alignment in step 410 for any reason) and (f) obstructions in the scene. An obstruction occurs if a first object covers segments of the FOV of a second object when the user desires to capture the second object. A R image may be used to detect motion blur or incorrect image alignment or obstructions in the scene, a T image analysis may be performed for detecting electronic noise. An error in fault detection step 412 may also be raised for other reasons one would generally, e.g. in the context of single image, not refer to as a "fault", but which may still cause an expected decrease in the quality of the SI or SW composed in step 414. Such reasons raising an error may be related to the camera specifications used for capturing the T image. Some of these specifications may e.g. be related to exposure, camera lens modes, or image sensor modes.

Some reasons may be related to scene characteristics that were not identified in the R image analysis. Consider for example a bright oscillating light source in $FOV_N$. The light source may have been "Off" when the R image was captured, but it may have been "On" when the respective T image was captured, causing large differences in the T camera parameters deployed for this T image in contrast to prior or consecutive T images. In such a scenario re-capturing the T image with the light source "Off" may be desired.

An additional fault reason may relate to mechanical faults, e.g. the OPFE did not reach the desired location accurately, and therefore issues in the alignment of the image may occur and the image needs to be recaptured.

Figure 15A:
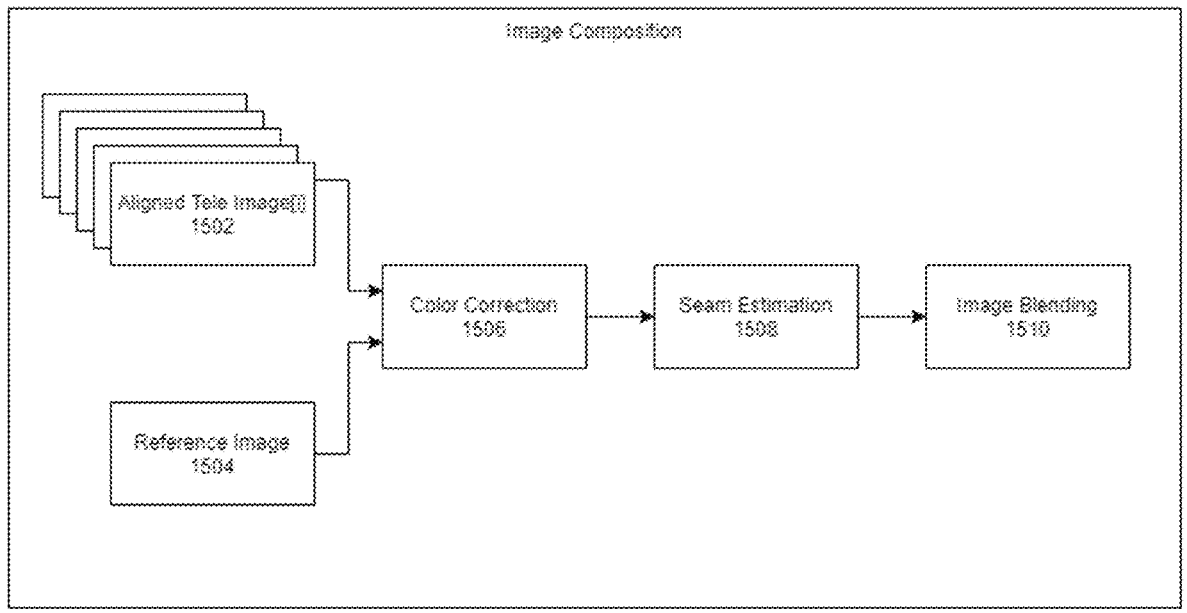
FIG. 15A is a flow chart showing steps of a method for SI composition.

FIG. 15A is a flow chart showing steps of a method for SI composition, i.e. details of a typical setup of the image composition step 414. The inputs are the two or more aligned T images and the previously found features from all the T images and from the R image (sub-steps 1502-1504). The first algorithmic sub-step is color correction sub-step 1506. Sub-step 1506 uses color correction based on the R image and not the other T images, and is therefore superior to other related color correction procedures used in panorama images as known in the art, which only use information from the image overlap to perform color correction. The color correction sub-step itself may be performed, for example, as in "Color Correction for Mobile Panorama Imaging" by Xiong et al., ICIMCS '09: Proceedings of the First International Conference on Internet Multimedia Computing and Service, 2009, pp. 219-226.

Figure 16A:
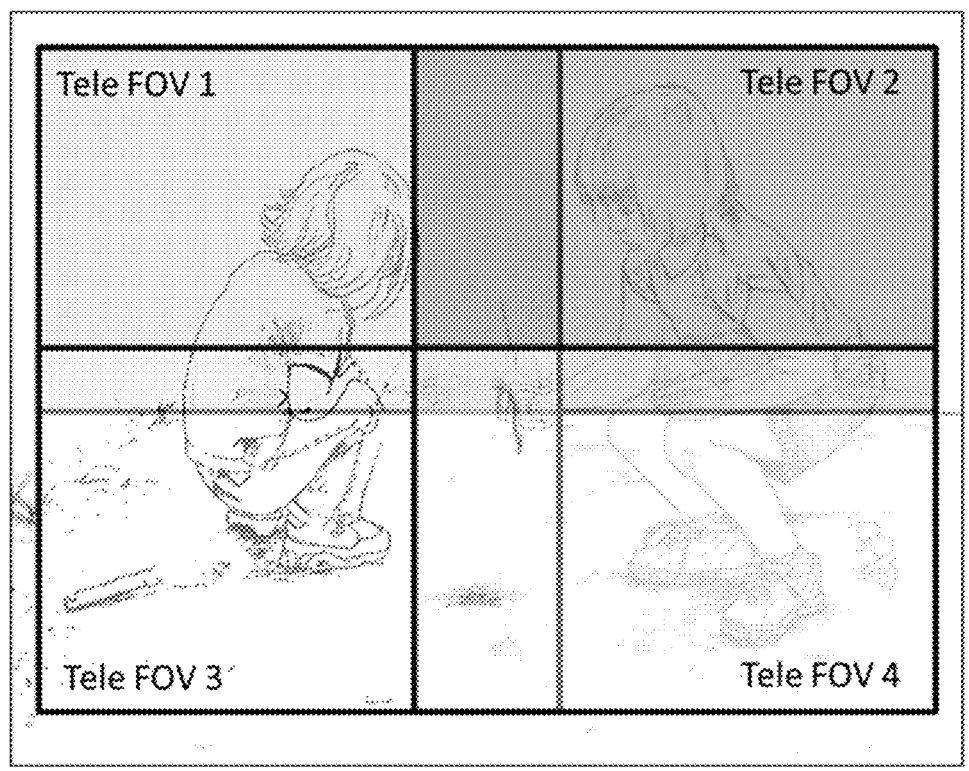
FIG. 16A shows a super image without the use of any color correction step.
Figure 16B:
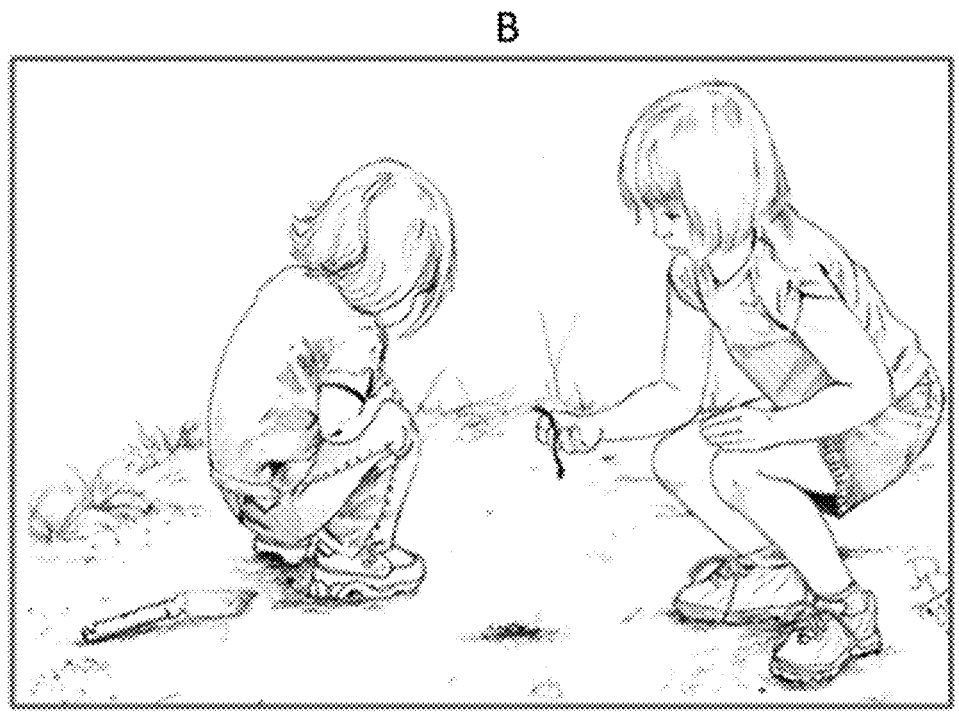
FIG. 16B shows a super image having the color correction step.

The influence of color correction step 1506 on the SI is shown in FIGS. 16A and 16B. FIG. 16A shows a SI without the use of any color correction step. The images showing different $FOV_T$s exhibit significant color differences between each other. T color differences are unnatural, i.e. they do not stem from differences in the scene. FIG. 16B shows a SI including the color correction step. The color correction ensures a seamless output image. Seam estimation sub-step 1508 finds the optimal seam along which one wants to combine two adjacent T images in the overlap region. This step can use seams such as, but not limited to, "Coarse-to-fine Seam Estimation for Image Stitching" by Liao et al. Image blending step 1510 may be done as known in the art, for example according to "A multiresolution spline with application to image mosaics" by Burt et al. ACM Transactions on Graphics, Vol. 2. No. 4, October 1983, pages 217-236.

Figure 15B:
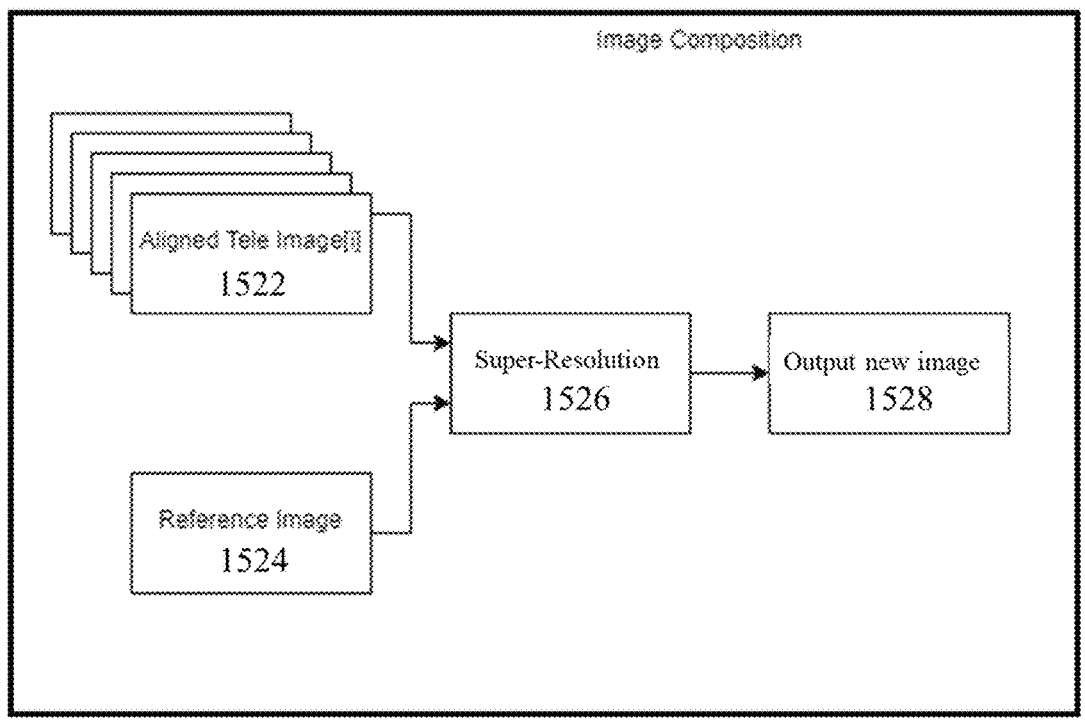
FIG. 15B is a flow chart showing steps of a SWM.

FIG. 15B is a flow chart showing steps of a SWM i.e. details of a typical setup of the steps 442 and 444. In step 1522, one or more T images that are each aligned with the R image and a R image are fed into super-resolution algorithm 1526. A new image is output in step 1528.

FIG. 17 shows schematically an embodiment of a mobile device numbered 1700 and including multi-cameras with at least one scanning Tele camera. Mobile device 1700 comprises a first scanning T camera module 1710 that includes an OPFE 1712 for FOV scanning, and a first lens module 1714 that forms a first image recorded by a first image sensor 1716. In other embodiments, camera module 1710 may include two OPFEs for FOV scanning. A first lens actuator 1718 may move lens module 1714 for focusing and/or optical image stabilization (OIS). An OPFE actuator 1720 may move the OPFE for (among others) scanning. In some embodiments, camera module 1710 may be a scanning Tele multi-zoom camera that can switch between Tele lens states having different zoom factors (ZF). With changing ZF, $FOV_T$ changes. A Tele multi-zoom camera with two discrete ZFs is described for example in co-owned international patent application PCT/IB2020/051405.

Mobile device 1700 may further comprise a R (e.g. W or UW) camera module 1730 with a FOV larger than the FOV of camera module 1710. Camera module 1730 includes a second lens module 1732 that forms an image recorded by a second image sensor 1734. A second lens actuator 1736 may move lens module 1732 for focusing and/or OIS.

In some embodiments, first calibration data may be stored in a first memory 1722 of a camera module, e.g. in an EEPROM (electrically erasable programmable read only memory). In other embodiments, first calibration data may be stored in a third memory 1750 such as a NVM (non-volatile memory) of mobile device 1700. The first calibration data may comprise calibration data for calibration between sensors of R camera module 1730 and of T camera module 1710. In some embodiments, second calibration data may be stored in a second memory 1738. In some embodiments, the second calibration data may be stored in third memory 1750. The second calibration data may comprise calibration data between sensors of R camera module 1730 and T camera module 1710.

Mobile device 1700 may further comprise an application processor (AP) 1740. In use, AP 1740 may receive respective first and second (reference) image data from camera modules 1710 and 1730 and supply camera control signals to camera modules 1710 and 1730. In some embodiments, AP 1740 may receive first image data from camera module 1710 and R image data from third memory 1750. In other embodiments, AP 1740 may receive calibration data stored in a first memory located on camera module 1710 and in a second memory located in camera module 1730. In yet another embodiment, AP 1740 may receive R image data stored in third memory 1750. In yet another embodiment, AP 1740 may retrieve R images from an external database. AP 1740 includes an image analyzer 1742 for analyzing R images (e.g. for scene understanding and defining a Tele scanning order) and T images (e.g. for fault detection), a FOV scanner 1744 that calculates an OPFE control signal (e.g. for implementing a Tele scanning order) and an image generator 1744 for composing new images as outlined in steps 402-414 and in steps 1502-1510 (for SIM) and in steps 422-444 and in steps 1522-1528 (for SWM).

While this disclosure has been described in terms of certain embodiments and generally associated methods, alterations and permutations of the embodiments and methods will be apparent to those skilled in the art. The disclosure is to be understood as not limited by the specific embodiments described herein.

All references mentioned in this application are incorporated herein by reference in their entirety. It is emphasized that citation or identification of any reference in this application shall not be construed as an admission that such a reference is available or admitted as prior art.

What is claimed is:

1. A method, comprising:
   providing a folded Tele camera configured to scan and capture a plurality of Tele images, each captured Tele image having a Tele image resolution ($RES_T$), a Tele image signal-to-noise-ratio ($SNR_T$) and a Tele field of view ($FOV_T$);
   obtaining and analyzing a reference (R) image with a R field of view $FOV_R > FOV_T$ having a R image resolution $RES_R < RES_T$, and/or a R signal-to-noise-ratio $SNR_R < SNR_T$;
   determining an order of one or more scanning $FOV_T$ positions for consecutive captures of the Tele images;
   capturing a Tele image at each respective scanning $FOV_T$ position;
   immediately after the capture of a Tele image and prior to the capture of an immediately following Tele image at each respective scanning $FOV_T$ position aligning each captured Tele image with the R image to obtain aligned Tele images,
   analyzing each Tele captured image for faults, and if faults are detected in the captured Tele image, re-capturing the Tele image at a same $FOV_T$ position, or, if faults are not detected in the Tele image, proceeding to capture an immediately following Tele image at a respective $FOV_T$ position; and
   using the aligned Tele images and the R image to create a new image having a field of view $FOV_N \leq FOV_R$ and $FOV_N > FOV_T$, wherein the image resolution of the new image $RES_N > RES_R$ and/or wherein the SNR of the new image $SNR_N > SNR_R$.

2. The method of claim 1, wherein the R image is a Wide image having a $FOV_W > FOV_T$, and wherein the Wide image is captured by a Wide camera included a multi-camera together with the folded Tele camera.

3. The method of claim 1, wherein the new image is a super image.

4. The method of claim 1, wherein the new image is a super wide image having a field of view $FOV_{SW}$ and wherein a FOV segment within $FOV_R$ included in at least one $FOV_T$ of the captured Tele images has a field-of-view union-$FOV_T$, and wherein union-$FOV_T < FOV_{SW} \leq FOV_R$.

5. The method of claim 1, wherein the faults are selected from the group consisting of motion blur, electronic noise, rolling shutter, defocus blur and incorrect image alignment or obstructions.

6. The method of claim 1, wherein the faults are mechanical faults.

7. The method of claim 1, further comprising, by a user or an algorithm, selecting a size of $FOV_N$ and a position of $FOV_N$ within a scene included in $FOV_R$.

8. The method of claim 1, wherein the Tele camera has an effective focal length of 7-40 mm.

9. The method of claim 1, wherein the determining an order of one or more scanning $FOV_T$ positions includes determining the order so that the new image covers a maximal FOV according to a mechanical limitation of the scanning.

10. The method of claim 1, wherein the determining an order of one or more scanning $FOV_T$ positions includes determining the order so that the new image covers a region of interest defined by an algorithm.

11. The method of claim 1, wherein the determining an order of one or more scanning $FOV_T$ positions includes determining the order so that the capturing of the Tele image at each respective scanning $FOV_T$ position includes capturing first moving objects, and then stationary objects in the captured Tele image.

12. The method of claim 1, wherein the determining an order of one or more $FOV_T$ positions so includes determining the order such that the capturing of the Tele image at each respective scanning $FOV_T$ position includes capturing a minimal number of Tele images.

13. The method of claim 1, wherein the determining an order of one or more scanning $FOV_T$ positions includes determining an order to follow a moving object with an object tracker.

14. The method of claim 1, performed by a smartphone.

15. A method, comprising:
  providing a folded Tele camera configured to scan and capture a plurality of Tele images, each captured Tele image having a Tele image resolution ($RES_T$), a Tele image signal-to-noise-ratio ($SNR_T$) and a Tele field of view ($FOV_T$);
  obtaining and analyzing a reference (R) image with a R field of view $FOV_R > FOV_T$ having a R image resolution $RES_R < RES_T$, and/or a R signal-to-noise-ratio $SNR_R < SNR_T$;
  determining an order of one or more scanning $FOV_T$ positions for consecutive captures of the Tele images so that the new image covers a region of interest selected by a user;
  capturing a Tele image at each respective scanning $FOV_T$ position;
  aligning the captured Tele images with segments of the R image to obtain aligned Tele images;
  using the aligned Tele images and the R image to create a new image having a field of view $FOV_N \leq FOV_R$ and $FOV_N > FOV_T$, wherein the image resolution of the new image fulfills $RES_N > RES_R$ and/or wherein the SNR of the new image fulfills $SNR_N > SNR_R$.

16. The method of claim 15, wherein the R image is a Wide image having a $FOV_W$, the Wide image captured by a Wide camera included a multi-camera together with the folded Tele camera.

17. The method of claim 15, wherein the new image is a super image.

18. The method of claim 15, wherein the new image is having a field of view $FOV_{SW}$, and wherein a FOV segment within $FOV_R$ included in at least one $FOV_T$ of the captured Tele images has a field-of-view union-$FOV_T$, and wherein union-$FOV_T < FOV_{SW} \leq FOV_R$.

19. The method of claim 15, wherein a user or an algorithm selects a size of $FOV_N$ and a position of $FOV_N$ within a scene included in $FOV_R$.

20. The method of claim 15, wherein the Tele camera has an effective focal length of 7-40 mm.

21. The method of claim 15, performed by a smartphone.

* * * * *